US010952219B2

(12) United States Patent
Janse van Rensburg et al.

(10) Patent No.: US 10,952,219 B2
(45) Date of Patent: Mar. 16, 2021

(54) METHOD AND APPARATUS FOR SCHEDULING USER DEVICE IN MULTI-USER MULTI-INPUT MULTI-OUTPUT WIRELESS SYSTEM

(71) Applicant: Futurewei Technologies, Inc., Plano, TX (US)

(72) Inventors: Cornelius Dawid Janse van Rensburg, Wylie, TX (US); Iyad Alfalujah, Bedminster, NJ (US)

(73) Assignee: Futurewei Technologies, Inc., Plano, TX (US)

(*) Notice: Subject to any disclaimer, the term of this patent is extended or adjusted under 35 U.S.C. 154(b) by 313 days.

(21) Appl. No.: 15/853,550

(22) Filed: Dec. 22, 2017

(65) Prior Publication Data

US 2019/0200336 A1    Jun. 27, 2019

(51) Int. Cl.
| | | |
|---|---|---|
| *H04W 72/04* | (2009.01) | |
| *H04W 72/12* | (2009.01) | |
| *H04B 7/06* | (2006.01) | |
| *H04W 52/02* | (2009.01) | |
| *H04L 5/00* | (2006.01) | |

(52) U.S. Cl.
CPC ........ *H04W 72/046* (2013.01); *H04B 7/0617* (2013.01); *H04L 5/00* (2013.01); *H04W 52/0216* (2013.01); *H04W 52/0219* (2013.01); *H04W 52/0245* (2013.01); *H04W 72/0473* (2013.01); *H04W 72/1205* (2013.01)

(58) Field of Classification Search
CPC ........... H04W 72/046; H04W 52/0216; H04W 52/0219; H04W 52/0245; H04W 72/0473; H04W 72/1205; H04B 7/0617; H04L 5/00

See application file for complete search history.

(56) References Cited

U.S. PATENT DOCUMENTS

| | | | |
|---|---|---|---|
| 9,307,544 B2* | 4/2016 | Gore | H04L 1/0027 |
| 9,408,220 B2* | 8/2016 | Gore | H04L 1/0026 |

(Continued)

FOREIGN PATENT DOCUMENTS

| | | |
|---|---|---|
| CN | 101621321 A | 1/2010 |
| CN | 107370529 A | 11/2017 |

OTHER PUBLICATIONS

Huawei, HiSilicon, "Beam measurement, reporting and indication", 3GPP TSG RAN WG1 Meeting #91 R1-1719422, Reno, USA, Nov. 27-Dec. 1, 2017, total 11 pages.

*Primary Examiner* — Ian N Moore
*Assistant Examiner* — Latresa A McCallum
(74) *Attorney, Agent, or Firm* — Slater Matsil, LLP (57) ABSTRACT

A base station is configured to perform a method for communicating with a plurality of user device (UD) multi-user multi-input multi-output (MU-MIMO) wireless system. The method includes receiving an indication of a selected beam from each of at least two UDs; determining, based on the indication of selected beam, a selected beam for each of the at least two UDs; generating a virtual UD for each combination of each selected beam; estimating a data rate for each virtual UD corresponding to the selected beam and the UD that selects the selected beam; estimating a power gradient for each selected beam; determining a power for each of the selected beams based on the power gradient for each of the selected beams; and scheduling outgoing radio frequency transmissions.

28 Claims, 6 Drawing Sheets

(56) References Cited

U.S. PATENT DOCUMENTS

| | | |
|---|---|---|
| 2009/0190488 A1 | 7/2009 | Hochwald et al. |
| 2012/0027111 A1* | 2/2012 | Vook et al. |
| 2018/0206218 A1* | 7/2018 | Huang ................ H04B 7/0695 |
| 2018/0263025 A1* | 9/2018 | Kim .................. H04W 72/1273 |
| 2019/0199413 A1* | 6/2019 | Sundararajan ....... H04B 7/0634 |

* cited by examiner

METHOD AND APPARATUS FOR SCHEDULING USER DEVICE IN MULTI-USER MULTI-INPUT MULTI-OUTPUT WIRELESS SYSTEM

TECHNICAL FIELD

The present description relates generally to wireless communications, and more particularly, but not exclusively, to a method of scheduling UDs in multi-user multi-input multi-output (MU-MIMO) wireless system.

BACKGROUND

MU-MIMO allows for downlink transmissions to multiple UDs from a base station (BS), e.g., an eNode-B, a gNode-B, using common time-frequency resources, i.e., schedule blocks. To separate the transmissions, MU-MIMO relies on the availability of multiple transmit antennas at the base station and on significantly different spatial radio channels between the UDs and the radio base station.

In a MU-MIMO system, due to its hardware constraints and limited processing capability, the base station needs to select a set of UDs from a large pool of candidate UDs of users to serve simultaneously. The UDs share the same frequency band employing spatial multiplexing. However, due to co-channel interference (CCI), the achievable system sum-rate is dependent on inter-correlation among multiple UDs. Thus, selection of a group of UDs with small mutual interference to be scheduled becomes an important problem.

SUMMARY

A first aspect of an example embodiment includes a method performed by a base station for communicating with a plurality of user device (UD). In the method, the base station receives an indication of a selected beam from each of at least two UDs. And then, the base station determines, based on the indication of a selected beam, a selected beam for each of the at least two UDs; generates a virtual UD for each combination of each selected beam and the UD that selects the selected beam; estimates a data rate for each virtual UD corresponding to the selected beam and the UD that selects the selected beam; estimates a power gradient for each of the selected beams based on the estimated data rates; determines a power for each of the selected beams based on the power gradient for each of the selected beams; and schedules, based on the determined power, outgoing radio frequency transmissions on one of the selected beams for one of the UDs who selects the scheduled beam. Through the above embodiment, the base station generates a virtual UD for each combination of each selected beam and the UD selects the selected beam, and estimates a data rate for each virtual UD and a power gradient for each selected beam based on the data rate, and schedules for the UD on one of selected beam. Therefore, the procedure of scheduling is easier than the prior art.

A second aspect of an example embodiment includes a base station for communicating with a plurality of user devices (UDs). Where, the network device comprise a non-transitory memory comprising instructions, and one or more processors in communications with the memory. Where the one or more processors are configured to execute the instructions to: receive an indication of a selected beam from each of at least two UDs; determine, based on the indication of the selected beam, a selected beam for each of the at least two UDs; generate a virtual UD for each combination of each selected beam and the UD that selects the selected beam; estimate a data rate for each virtual UD corresponding to the selected beam and the UD that selects the selected beam; estimate a power gradient for each of the selected beams based on the estimated data rates; determine a power for each of the selected beams based on the power gradient for each of the selected beams; and schedule, based on the determined power, outgoing radio frequency transmissions on one of the selected beams for one of the UDs who selects the scheduled beams.

A third aspect of an example embodiment includes a computer readable media that includes computer instructions that, when executed by a processor, cause a processor host device to perform the steps of: receiving an indication of a selected beam from each of at least two UDs; determining, based on the indication of selected beam, the selected beam for each of the at least two UDs; generating a virtual UD identifier (ID) for each combination of each selected beam and the UD that selects the selected beam; estimating a data rate for each virtual UD corresponding to both the selected beam and the UD that selects the selected beam; estimating a power gradient for each of selected beams based on the estimated data rates; determining a power for each of the selected beams based on the power gradient for each of the selected beams; and scheduling, based on the determined power, outgoing radio frequency transmissions on one of the selected beams for one of the UDs who selects the scheduled beam.

A fourth aspect of an example embodiment includes a base station. Wherein the base station includes the function of the base station in the first aspect of an example embodiment. The functions may be realized by hardware, or may be realized by software which are performed by hardware. And the hardware or the software include one or more module corresponding to the functions.

A fifth aspect of an example embodiment includes a computer storage media. Where the computer storage media stores instructions performed by the base station in the first aspect of an example embodiment, and stores the program performed in the first or the fourth aspect of an example embodiment.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

In the following description, reference is made to the accompanying drawings that form a part of the present disclosure, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be defined by software executed by a processor in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Embodiments of this disclosure provide systems and methods for performing scheduling of user device (UD) in multi-user multi-input multi-output (MU-MIMO) wireless system based on the beams selected by the UD. The scheduling is performed on a per-layer subband basis while being cyclic across the sub-frames. A base station determines power per beam and may schedule for the UD on the beam with higher power for transmitting outgoing radio frequency signals to improve the transmission quality. In the embodiments, the beam being scheduled may be referred to as the scheduled beam.

One scheduling solution for MU-MIMO is based on channel quality indicator (CQI) information, pre-coder matrix indication (PMI) information and rank indicator (RI) information received from each of the UDs being serviced by the base station. In this scheduling solution, the RI indicates that a number of beams from the base station is selected by the UD. The PMI indicates an index (identifier) of each of at least one beam selected by the UD. The CQI indicates a channel quality of the UD. Based on the index of each of the at least one beam selected by the UD, the base station divides the UDs into different groups. For each group, the base station allocates power evenly to each UD in the group, and estimates the group rate. The base station then determines to schedule for the UDs in the group with highest group rate. In this solution, the base station should obtain all beam information from the UD's to determine which beam combination is the best for the UDs. This solution is resource intensive, because there are many beam combinations that must be evaluated to determine which beam or beam combination should be scheduled.

Other power control algorithms and scheduling algorithms are derived from a MU-MIMO wireless system. Most LTE UDs have multiple antennas and the MIMO may be a default mode of operation. The embodiments disclosed herein feature power control algorithms on a per layer basis that accommodates time division duplex (TDD)/frequency division duplex (FDD) LTE with a MIMO channel model. Where there is explicit inter-eNB or gNB communication. The power control algorithms are based on a network utility maximization (NUM) framework. In MU-MIMO, the system has the freedom to schedule any user on any layer in a subband.

Figure 1:
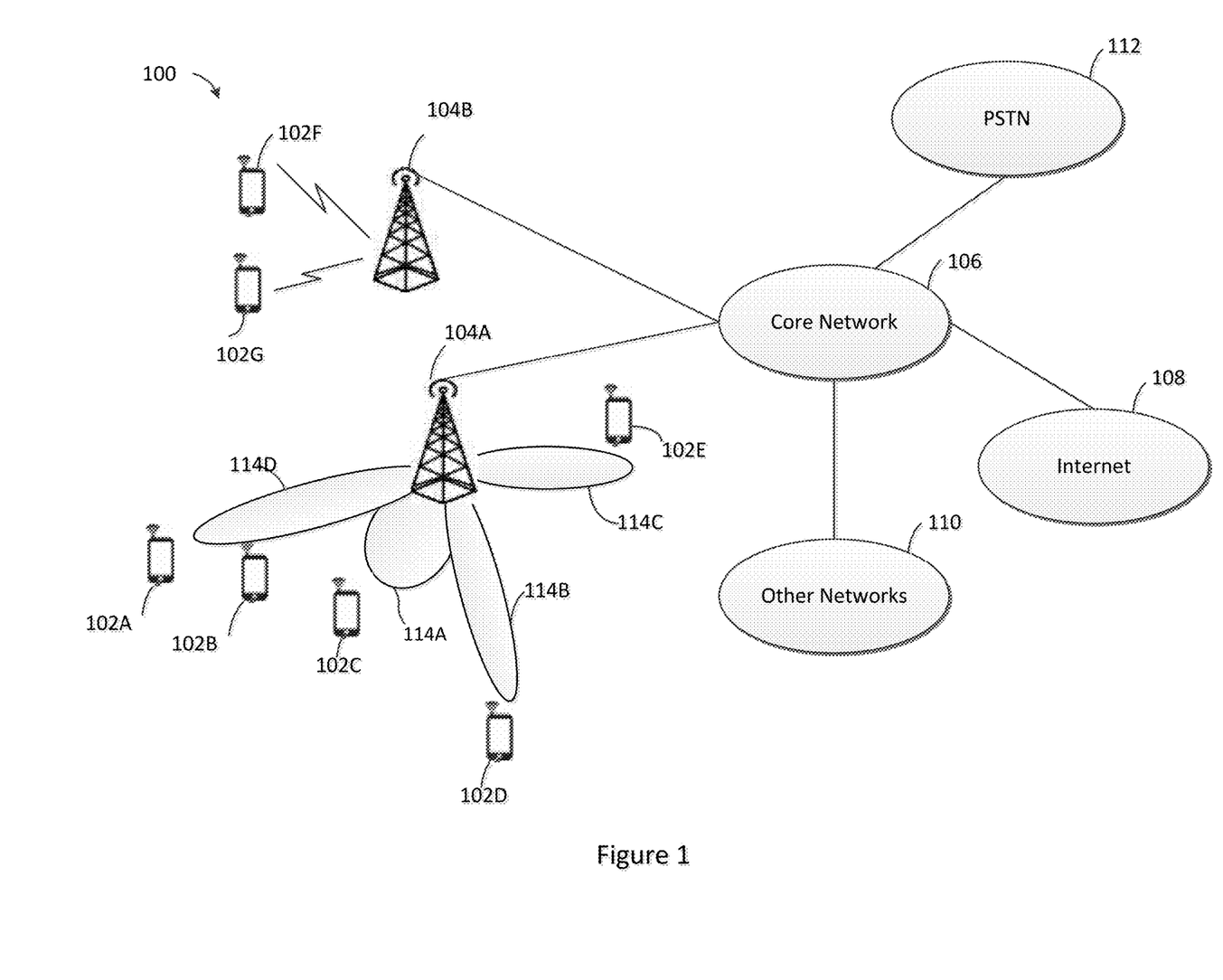
FIG. 1 illustrates an example of a communication system that may be used for implementing the devices and methods disclosed herein.

FIG. 1 illustrates an example communication system 100 that may be used for implementing the devices and methods disclosed herein. In general, the system 100 enables multiple wireless users to transmit and receive data and other content including text data, audio data and video data. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA), or non-orthogonal multiple access (NOMA), etc.

In this example, the communication system 100 includes multiple user devices (UDs) (for example UDs 102A-102G), multiple base stations (for example, the base stations 104A-104B), a core network 106, a public switched telephone network (PSTN) 112, an Internet 108, and other networks 110. While certain numbers of these components or elements are shown in FIG. 1, any number of these components or elements may be included in the system communication 100. The UDs 102A-102G couple to the based stations 104A-104B, and the base stations 104A-104B couple to the core network 106, The UDs 102A-102G are configured to operate and/or to communicate in the system 100. For example, the UDs 102A-102G are configured to transmit wireless signals to the base stations 104A-104B and/or receive wireless signals via the beams from the base stations 104A-104B. Before the UDs 102A-102G receive and/or transmit, the UDs receive control information from the base station 104A or 104B via a control channel. The control information comprises beam information generated by the base station 104A or 104B. Each UD of the UDs 102A-102G then selects at least one beam based on the beam information in the control information, and sends an indication of the selected beam(s) to the base station 104A or 104B.

UDs 102A-102G represent any suitable end user device and may include such devices (or may be referred to) as, wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

Each base station 104A-104B is configured to wirelessly communicate with one or more of the UDs 102A-102G to enable the UDs 102A-102G access to the core network 106, the PSTN 112, the Internet 108, and/or the other networks 110. For example, the base stations 104A-104B may include (or be) one or more of several well-known devices, such as a base transceiver station (BTS), a Node-B (NodeB), an evolved NodeB (eNodeB or eNB or gNB), a Home NodeB, a Home eNodeB, a site controller, an access point (AP), a wireless router, a server, a switch, or any other suitable processing device with a wired or wireless network.

In the embodiment shown in FIG. 1, the base station 104A or 104B may form part of a radio access network (RAN), which may include other base stations, elements, and/or devices. Each base station 104A-104B operates to transmit and/or receive wireless signals within a particular geographic region or area, sometimes referred to as a "cell." In some embodiments, multiple-input multiple-output (MIMO) technology may be employed having multiple transceivers for each cell.

The base stations 104A-104B communicate with one or more of the UDs 102A-102G over one or more air interfaces using wireless communication links. The air interfaces may utilize any suitable radio access technology. Typically, the base station 104A or 104B receives a channel condition message or a sounding reference signal (SRS) from each of the UDs 102A-102G. Each of the channel condition messages identifies at least one beam selected by the UD sending the channel condition message. And each of SRSs may also include the indication of at least one beam selected by the UD sending the SRS. The base station 104A or 104B then schedules for the UDs 102A-102G based on the beams selected by the UDs 102A-102G. The beams selected by the UDs (any of 102A-102G) are an indication that the UD (any of 102A-102G) would like to receive communication signals from the base station 104A or 104B using at least one of the selected beams. Typically, the UDs select the beams based on received signal quality.

It is contemplated that the system 100 may use multiple channel access functionality, including such schemes as described herein. In particular embodiments, the base stations 104A-104B and UDs 102A-102G are configured to implement one or more of the various wireless standards including Long-Term Evolution (LTE), LTE-A, and/or LTE-B or LTE-NR (New Radio). Additionally, in accordance with this disclosure, one or more of the base stations 104A-104B and UDs 102A-102G are configured to communicate according to coordinated MIMO switching standards. Of course, other multiple access schemes and wireless protocols may be utilized and are specifically included.

The base stations 104A-104B are in communication with the core network 106 to provide the UDs 102A-102G with voice services, data services, application services, voice over Internet protocol (VoIP) services, or other services. Understandably, the base stations 104A-104B and/or the core network 106 may be in direct or indirect communication with one or more other base stations (not shown in FIG. 1). The core network 106 may also serve as a gateway access device for other networks (such as PSTN 112, Internet 108, and other networks 110). In addition, some or all of the UDs 102A-102G may include functionality for communicating with different wireless networks over different wireless links using different wireless technologies and/or protocols.

Although FIG. 1 illustrates one example of a communication system, various changes may be made to FIG. 1 while staying within the scope of the present disclosure. For example, the communication system 100 may include any number of UDs, base stations, networks, or other components in any suitable configuration.

Figure 2:
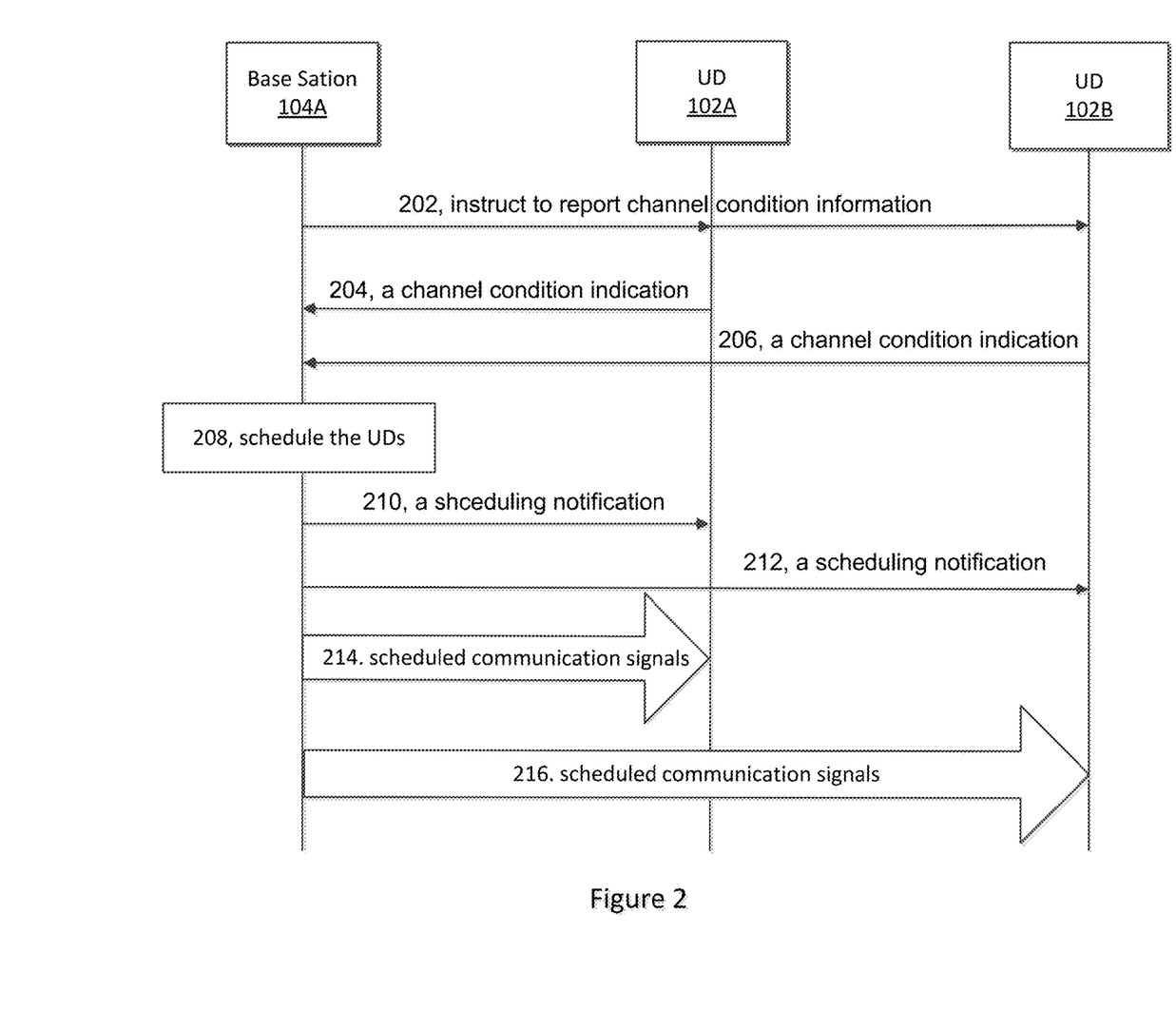
FIG. 2 illustrates an example of a method for scheduling a user device in a multi-user multi-input multi-output wireless system, according to this disclosure.

FIG. 2 illustrates an example of a method for scheduling a user device in a multi-user multi-input multi-output wireless system, according to this disclosure. The example of FIG. 2 may be carried out in the context of the system as illustrated in FIG. 1.

Initially, the base station 104A sends an instruction in step 202 to multiple UDs though only two UDs 102A and 102B are shown in FIG. 2 to instruct the UDs 102A-102B to report channel condition information to the base station.

Typically, the instruction is sent by the base station 104A via a system information block (SIB) channel to all the UDs (such as UDs 102A-102B) in a certain area that the base station 104A covers. The channel condition information requested by the base station may include a channel quality indicator (CQI) information, precoder matrix indicator (PMI) information, reference signal received power (RSRP) information and so on. The area covered by the based station 104A means the area in which the UDs may receive signal from the base station 104A. In the instruction, the base station 104A also instructs the UDs 102A-102B to report the channel condition information by using a single-user multi-input multi-output (SU-MIMO) reporting method for reporting at least one selected beam or PMI. The SU-MIMO reporting method allows a UD to select one or more beams.

In steps 204 and 206, each of UDs 102A-102B sends a channel condition indication including an indication of one or more selected beams to the base station 104.

If frequency division duplexing (FDD) mode is being used by the UD, each channel condition indication from the UD (102A or 102B) may be a channel condition message which include a channel quality indicator (CQI) parameter, a PMI parameter, a Rank indictor (RI) parameter of the respective UD (102A or 102B), and a RSRP parameter of the respective UD (102A or 102B). Because the instruction 202 instructs the UDs 102A-102B to report in the SU-MIMO mode, the channel condition messages from the UDs 102A-102B may comprise one or more beam indexes in the PMI parameter. In the channel condition message, the PMI parameter may be the indication of one or more selected beams, and the PMI indicates one or more beam indexes (or identifiers) which identify the one or more beams selected by the UD. The RI parameter indicates the quantity of the selected beams. For example, if the value of RI parameter is 2, the PMI parameter comprises two beam indexes (or identifiers). The value of RI in the channel condition message may be an integer that is not greater than a number of antennas of the base station.

If time division duplexing (TDD) mode is being used by the UD, the channel condition indication sent by the UD (102A or 102B) may be a sounding reference signal (SRS). The SRS transmitted from the UD 102A (as an example) allows the base station 104A to obtain the quality of the channel, e.g., the channel quality indicator CQI, at difference frequencies. The SRS from the UD 102A may also allow the base station 104A to obtain the beams selected by the UD 102A, the RI of the UD 102A, and the RSRP of the UD 102A based on the SRS.

In step 208, the base station 104A schedules for the UDs 102A-B based on the channel condition indications from the UDs 102A-B. This is described in greater detail in relation to FIG. 3.

In step 210 or 212, the base station 104A sends a scheduling notification to the UD 102A-B respectively based on the scheduling of step 208.

In step 210, the scheduling notification comprises the beam index of beam scheduled to the UD 102A. In step 212, the scheduling notification comprises the beam index of beam scheduled to the UD 102B. The beam identified in the scheduling notification may be referred to as a scheduled beam.

The scheduling notifications sent to the UDs 102A-102B may be sent via a physical downlink control channel (PDDCCH) in one embodiment.

In steps 214-216, the base station 104A transmits scheduled communication signals to the UDs 102A-102B corresponding to the beam index in the scheduling notification, respectively. Typically, the signal is transmitted via a physical downlink shared channel.

It is noted in the example of FIG. 2, there is no sequence between steps 204-206, and between steps 210-210, and between steps 214-216.

Figure 3:
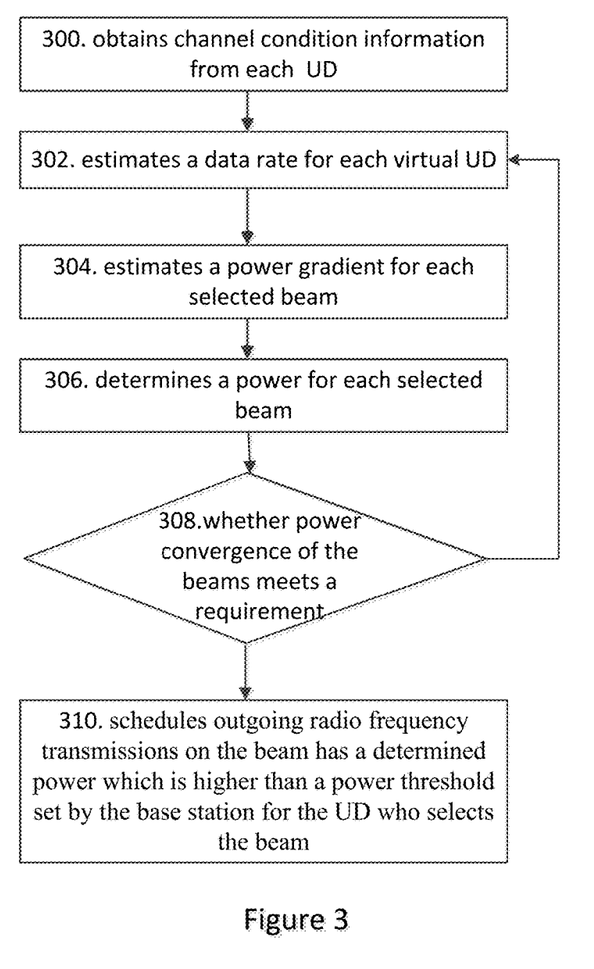
FIG. 3 illustrates an example of a method for scheduling a user device by the base station, according to this disclosure.

FIG. 3 illustrates an example embodiment of a method for scheduling a UD by the base station.

In step 300, the base station 104A obtains channel condition indication including an indication of a selected beam from each of the UDs in an area covered by the base station 104A (UD 102A-B as an example). The channel condition indication includes CQI information, PMI information, RI information and RSRP information of the corresponding UE. In one embodiment, as will be described in more detail below, the base station 104A can receive the channel condition information from the UD. In another embodiment, the base station 104A estimates the channel condition information from the sounding reference signals received from the UD.

If the FDD mode is being used for the communication channels, the base station 104A receives a channel condition message that includes the CQI parameter, the PMI parameter, the RI parameter and the RSRP parameter of the respective UD (102A or 102B). After receiving the channel condition messages from the UDs 102A-B, the base station 104A obtains the CQI information, the PMI information, RI information and RSRP information of UDs 102A-B respectively based on the parameters in the received channel condition messages.

If the TDD mode is being used for the communication channels, the base station 104A obtains the CQI information, the PMI information, the RI information and the RSRP information of UDs 102A-B via estimating the sounding reference signal from each of the UDs 102A-B. Where, the sounding reference signals (SRS) sent by the UDs 102A-B are used by the base station 104A to estimate the uplink channel conditions (such as CQI, the PMI, the RI and the RSRP) for each of the UDs to decide the best downlink scheduling.

In step 302, the base station 104A estimates a data rate for each virtual UD based on the PMI parameter in step 302. The assigned data rate is a long term average rate, specified by megabits per second. Because the embodiments of the disclosure include an ability for a UD to specify more than one selected beam, and because the base station may assign a virtual UD to each selected beam selected by the UD, a virtual UD is generated for each combination of each selected beam and the UD that selects the selected beam. Therefore, the virtual UDs are generated by the base station to correspond to the selected beams and the UD selects the beams. Thus, in the step 302, the base station 104A is estimating the data rates for the virtual UDs.

As described in step 204, the PMI parameter indicates one or more beams selected by the UD 102A. And the number of beam indexes (or beam identifiers) in the PMI parameter equal to a value of the RI parameter. A beam may be selected by at least two UDs, and a UD may select at least one beam. A virtual UD corresponds to the selected beam and the UD that selects the selected beam. That means, the virtual UD is a combination which identifies the UD and one selected beam selected by the UD. As an example, both the UDs 102A and 102B select the beam 114D, and the UD 102B also selects the beam 114A. Therefore, there are 3 virtual UDs. The virtual UDs in the example may be shown by table 1. Referring to table 1, the virtual UD i1 is the UD 102A corresponding to the beam 114D, the UD i2 is the UD 102B corresponding to the beam 114D, the UD i3 is the UD 102B corresponding to the beam 114A.

TABLE 1

| Virtual UD identifier (ID) i | Beam identifier | UD ID selects the beam |
|---|---|---|
| UD i1 | beam 114D | UD 102A |
| UD i2 | beam 114D | UD 102B |
| UD i3 | beam 114A | UD 102B |

In this example, the UD 102B selects two beams 114A and 114D, the data rate for the UD 102B should be estimated two times, one time is estimated for the virtual UD i2 which identifies the UD 102B corresponding to the beam 114D, and one time is estimated for the virtual UD i3 which identifies the UD 102B corresponding to the beam 114A.

To illustrate the disclosed embodiments, considers that the base station 104B serves a number of $r \in \mathcal{R}$ real or physical UDs. All the UDs 102A-102G are real or physical, if there is no specific description, the term "UD" in the embodiments means a real or a physical UD. Given a set of selected beams for UD r. The beam p uses an amount of power $P_{pj}$ in a subband j. Define all the UDs selecting beam p as the set $\mathcal{P}_p$ (such as both the UD 102A, and the UD 102B select the beam 114A, the set $\mathcal{P}_p$ may be $\mathcal{P}_{114A}$ for the UD 102A, and $\mathcal{P}_{114A}$ for the UD 102B). A UD with a higher value in RI parameter corresponds to multiple virtual UDs, belongs to multiple sets $\mathcal{P}_p$. Such as the UD 102B, referring to table 1, belongs to the set $\mathcal{P}_{114A}$ and the set $\mathcal{P}_{114D}$. In the embodiment, all the beams are simultaneously used in the MU-MIMO way. Each virtual UD will then experience the total interference from every other beam (p'). The signal-to-interference-plus-noise ratio (SINR) for a virtual UD i may be referred to an equation 1 or 1' given a PMI report:

$$s_{ij} = \frac{(a_p^H a_p)^2 P_{pj}}{I_i + \sum_{p' \neq p} (a_p^H a_{p'})^2 P_{p'j}} \quad \forall i \in \mathcal{P}_p \tag{1}$$

Or alternatively given an SRS sounding measurement as $$s_{ij} = \frac{(h_{ij}^H a_p)^2 P_{pj}}{I_i + \sum_{p' \neq p} (h_{ij}^H a_{p'})^2 P_{p'j}} \quad \forall i \in \mathcal{P}_p \tag{1'}$$

Wherein, the $I_i$ means inter cell interference for a virtual UD i, and the $h_{ij}^H$ is the measured channel from virtual UD to the serving NB. And $I_i$ may refer to an equation 2:

$$I_i = (N_0 + I_{intercell})/G_i \tag{2}$$

Where, $N_0$ indicates a thermal noise level of the base station 104A. The thermal noise is electronic noise generated by thermal agitation of charge carriers inside an electrical conductor at equilibrium, which happens regardless of any applied voltage. Normally, the value of the thermal noise level may be −174 dBm/Hz. The $I_{intercell}$ is interference which is experienced by the UD from other cells. The $I_{intercell}$ may be obtained based on the CQI of the $UD_i$. The $G_i$ is a path gain (or a channel gain) of the $UD_i$. The path gain is a product of the gains of all branches in the path. The path Gain of the UD i may be obtained from the channel condition information of the corresponding $UD_i$, such as from the RSRP obtained from the UD. If multiple virtual $UD_i$ correspond to a UD, (such as virtual UD i2 and virtual UD i3 correspond to the UD 102B, the $G_i$ for all the virtual UDs (virtual UD i2 and virtual UD i3) corresponding to UD 102B are same.

In case of a real LTE user, $P_{CRS}/I_i$ is the reported CQI for the UD which the virtual UD i belongs to. The $P_{CRS}$ is the power of common reference signal, is known by the base station 104A. The $I_i$ can be calculated based on the CQI information and the RSRP information. Actually, the RSRP equals to an equation $G_i P_{CRS}$. Therefore the $G_i$ may be obtained based on the RSRP information.

The virtual UD i will have an instantaneous channel capacity of $$c_{ij} = \log_2(1+s_{ij}) \tag{3}$$

Where each virtual $UD_i$ has a probability $\phi_{ij}$ of being scheduled on the subband j. The base station 104A may calculate the $\phi_{ij}$ as the average number of times that $UD_i$ was scheduled on the subband j in the past. The base station 104A calculates the data rate of a virtual UD i based on the probability of being scheduled on the subband j $\phi_{ij}$ and the instantaneous channel capacity $c_{ij}$. The average data rate for the virtual UD i may be calculated via an equation 4:

$$X_i = \Sigma_j \phi_{ij} c_{ij} \tag{4}$$

In addition, after calculating the data rate for each virtual $UD_i$, the base station 104A may calculate a data rate of the real UD which the virtual UD i belongs to via an equation 5:

$$X_r = \Sigma_{i \in r} X_i \tag{5}$$

In step 304, the base station 104A estimates a power gradient for each selected beam.

The power gradient $$\frac{\partial U}{\partial P_{pj}}$$

for the selected beam is related to a power gradient of each other beams in the cell, and may be referred to an equation 8.

$$\frac{\partial U}{\partial P_{pj}} = \sum_{r \in \mathcal{R}} \frac{\partial U_r}{\partial X_r} \left( \sum_{i \in r} \frac{\partial X_r}{\partial c_{ij}} \frac{\partial c_{ij}}{\partial P_{pj}} \right) \tag{8}$$

Where, U indicates a total utility for the base station 104A, and $U_r$ indicates a utility for UD r. There are many choices for $U_r$. As one example, the $U_r$ may be equal to $\log(X_r)$ which is known as proportional fair utility. The base station 104A may be configured the solution of obtaining and $$U_r \cdot \frac{\partial c_{ij}}{\partial P_{pj}}$$

may be referred to an equation 10, and the $$\frac{\partial X_r}{\partial c_{ij}}$$

may be referred to an equation 9.

a rate gradients of $$UDr\left(\frac{\partial X_r}{\partial c_{ij}}\right)$$

may be calculated based on the data rate $X_r$ of UD r and the instantaneous channel capacity $c_{ij}$. and the gradients $$\frac{\partial X_r}{\partial c_{ij}}$$

of UD r may be calculated based on the equation 9:

$$\frac{\partial X_r}{\partial c_{ij}} = \phi_{ij} \tag{9}$$

And given PMI reports $$\frac{\partial c_{ij}}{\partial P_{pj}} = \begin{cases} \frac{-s_{ij}^2}{P_{p'j}(1+s_{ij})} \frac{(a_p^H a_{p'})^2}{(a_p^H a_p)^2} & \forall i \notin \mathcal{P}_p, i \in \mathcal{P}_{p'} \\ \frac{s_i}{P_p(1+s_i)} & \forall i \in \mathcal{P}_p \end{cases} \tag{10}$$

Or alternatively given SRS sounding measurements as $$\frac{\partial c_{ij}}{\partial P_p} = \frac{-s_{ij}}{P_{p'j}(1+s_{ij})} \frac{(h_{ij}^H a_{p'})^2}{(h_{ij}^H a_p)^2} \quad \forall i \notin P_p, i \in P_{p'} \tag{10a}$$

The base station 104A will calculate a power gradient for each virtual $UD_i$ relative to each beam's power namely to $$\frac{\partial U_i}{\partial P_p}.$$

The beam's power gradient is the sum of the power gradients of all the virtual UD corresponding to the beam.

In step 306, The base station 104A determines a power for each selected beam, based on the power gradient for each selected beam.

At first, the base station should obtain the total cell gradient of all the virtual UD corresponding to the selected beam based on the power gradient for each selected beam, and then determines a power for each selected beam based on the determines a power for each selected beam.

$P_{pj}(t)$ indicates the power for the selected beam. By calculating the power for each selected beam $P_{pj}(t)$, the base station 104A maximizes the power gradient $$\frac{\partial U}{\partial P_{pj}}$$

by varying the powers for all the UDs.

$$P_{pj}(t) = P_{pj}(t-1) + \beta \frac{\partial \mathcal{L}}{\partial P_{pj}} \quad (11)$$

Where, the t indicates a time of power update iteration, which also called a current time. The t−1 indicates a previous iteration time. Therefore, the $P_{pj}(t)$ indicates the estimated power in the subband j on the beam p at the current time, and $P_{pj}(t-1)$ indicates the power in the subband j on the beam p at the previous iteration time. The Lagrangian $\mathcal{L}$ in an equation 11 may be defined as an equation 7 as follows:

$$\mathcal{L} = U - \lambda_j(t)(\Sigma_p P_p(t) - P_{max}) \quad (7)$$

and $$\frac{\partial \mathcal{L}}{\partial P_{pj}}$$

in the equation 11 is defined as an equation 6 as follows:

$$\frac{\partial \mathcal{L}}{\partial P_{pj}} = \frac{\partial U}{\partial P_{pj}} - \lambda_j(t) \quad (6)$$

The $\lambda_j(t)$ in the equation 7 may be defined as an equation 12 as follows:

$$\lambda_j(t) = \lambda_j(t-1) + \beta(\Sigma_p P_{pj}(t) - P_{max}) \quad (12)$$

Where the $P_{max}$ indicates the max power for the selected beam. The $P_{max}$ is configured by the base station 104A. Normally, the $P_{max}$ for each selected beam is the same as the total power allocated to the subband j.

In step 308, after determining the power for each selected beam the $P_{pj}(t)$ in current time, the base station 104A determines whether power convergence of the beams of the base station 104A meets a requirement of scheduling for the UDs. If yes, the base station performs step 310, or the base station 104A returns to perform step 302.

A minimum positive constant has been set in the base station 104A as the requirement of scheduling for the UDs. If the power convergence is larger than the minimum power positive constant, the base station 104A determines that the power convergence of the beams of the base station 104A meets the requirement of scheduling for the UDs.

In step 310, the base station 104A schedules outgoing radio frequency transmissions on the beam has a determined power which is higher than a power threshold set by the base station for the UD who selects the beam.

Typically, a power threshold is set in the base station 104A. Based on the power for the beam $P_{pj}(t)$, if the value of the power of the selected beam $P_{pj}(t)$ is higher than the power threshold, the selected beam may be scheduled to transmit to the UD who selects the beam based on the PMI information in step 302. In the embodiment, the selected beam which may be scheduled to transmit may be referred to as a scheduled beam.

The power threshold may be set based on practical constraints, such as a minimal supported modulation and a coding scheme (MCS) or a minimal detectable SINR provided by the UD. The embodiment will not limit the method of setting the power threshold.

If there are multiple UDs select a same scheduled beam, the UD r corresponding to a virtual UD i with the largest marginal utility $i_{pj}^*$ should be scheduled to receive signal from the scheduled beam, based on an equation 13. Therefore, before scheduling, the based station obtains, based on the determined power and the power gradient, a marginal utility for each of the UDs of the at least two selected beams with the determined power which is higher that the power threshold are selected by one of the at least two UDs, referring to the equation 13.

$$i_{pj}^* = \max_{i \in \mathcal{P}_{pj}} \frac{\partial U_i}{\partial \phi_{ij}} \quad (13)$$

If multiple scheduled beams are selected by a single UD, the beam corresponding to a virtual UD with the highest marginal utility $i_{pj}^*$ will be scheduled to the selected beam. Therefore, before scheduling, the based station obtains, based on the determined power and the power gradient, a marginal utility for each of virtual UDs which correspond to the selected beams with the determined power which is higher that the power threshold are selected by one of the at least two UDs, referring to the equation 13. The virtual UD corresponding to the at least two selected beams also corresponds to the UD who selects the at least two selected beams.

One aspect of the described embodiment is that the base station 104A may schedule for the UD on one of the selected beams of the UD even if a single UD may select at least two beams. In the method, the base station 104A estimates a data rate for each virtual UD of each UD, and determines power for each selected beam based on the data rate of the virtual UD for each selected beams, and schedules for the UD based on the determined power.

Figure 4:
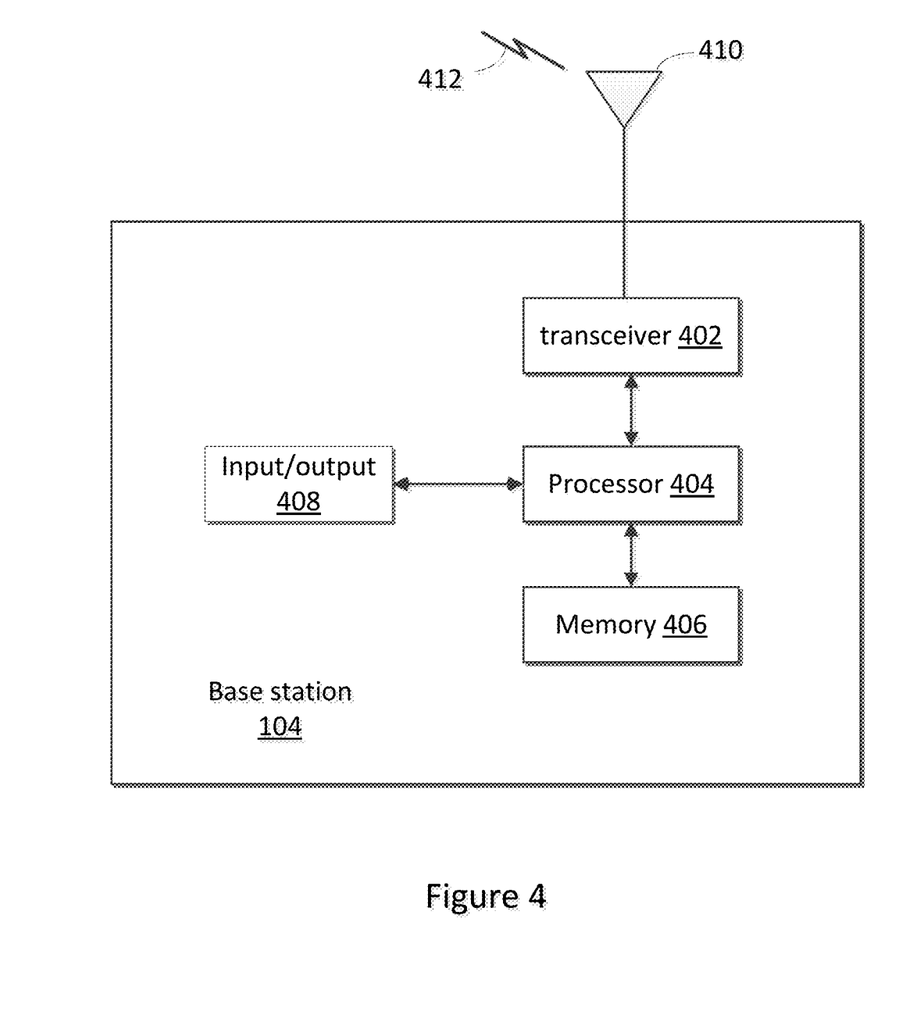
FIG. 4 illustrates an example of a base station that may be used for implementing the methods, according to the disclosure.

FIG. 4 illustrates an example of a base station that may be used for implementing the methods and teachings disclosed herein. These components could be used in the system 100 or in any other suitable system, and performs the steps of FIGS. 2 and 3 performed by base station.

As shown in FIG. 4, the base station 104 includes at least one processor 404, at least one transceiver 402, which includes functionality for a transmitter and a receiver, multiple antennas 410, at least one memory 406, and one or more input/output devices or interfaces 408. The processor 404 implements various processing operations of the base station 104, such as signal coding, data processing, power control, input/output processing, or any other functionality. The processor 404 can also support the methods and teachings described in more detail above corresponding to FIGS. 1-3. Each processor 404 includes any suitable processing or computing device configured to perform one or more operations. Each processor 404 could, for example, include a microprocessor, microcontroller, digital signal processor, field programmable gate array, or application specific integrated circuit.

Each transceiver 402 includes any suitable structure for generating signals for wireless or wired transmission to one or more UDs or other devices. Each transceiver 402 further includes any suitable structure for processing signals received wirelessly or by wire from one or more UDs or other devices. Although shown combined as a transceiver 402, a transmitter and a receiver could be separate components. Each antenna 410 includes any suitable structure for transmitting and/or receiving wireless or wired signals. While a common antenna 410 is shown here as being coupled to the transceiver 402, one or more antennas 410 could be coupled to the transceiver(s) 402, allowing separate antennas 410 to be coupled to the transmitter and the receiver if equipped as separate components. Each memory 406 includes any suitable volatile and/or non-volatile storage and retrieval device(s). Each input/output device 408 includes any suitable structure for providing information to or receiving/providing information from a user, including network interface communications.

Figure 5:
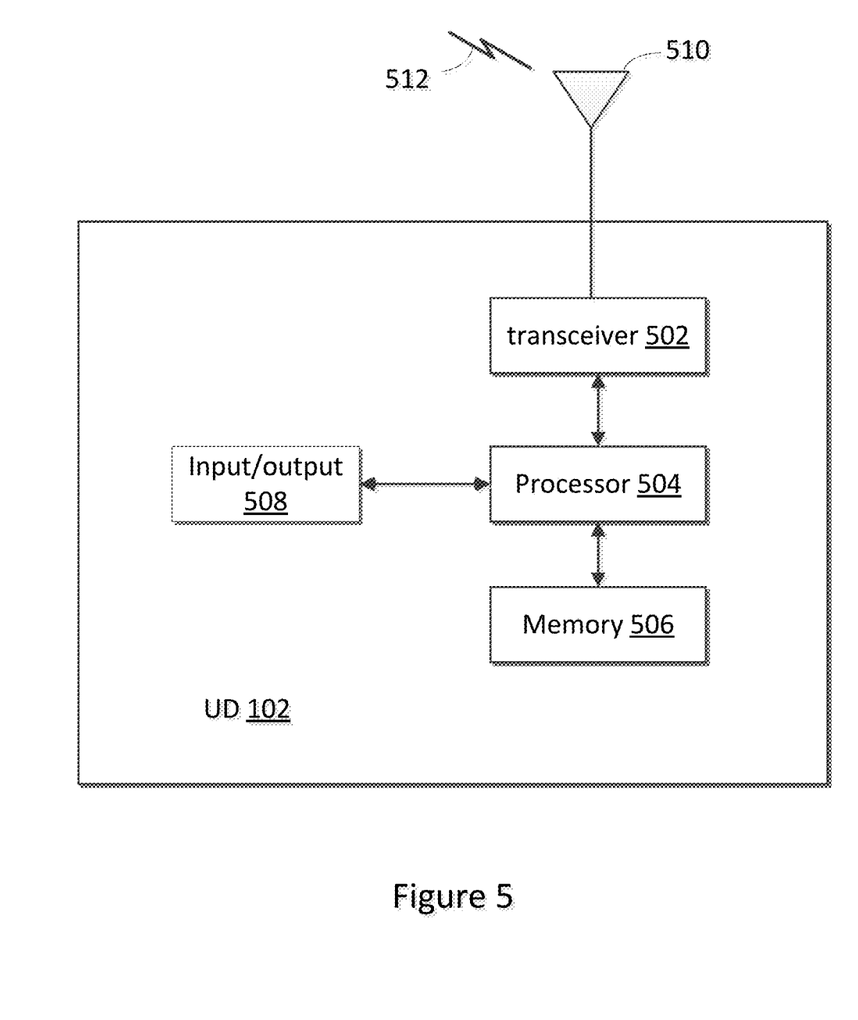
FIG. 5 illustrates an example of a user device that may be used for implementing the methods, according to the disclosure.

FIG. 5 illustrates an example of a UD that may be used for implementing the methods and teachings disclosed herein. These components could be used in the system 100 or in any other suitable system, and performs the steps of FIGS. 1-3 performed by UD.

As shown in FIG. 5, the UD 102 includes at least one processor 504. The processor implements various processing operations of the UD 102. For example, the processor 504 could perform signal coding, data processing, power control, input/output processing, or any other functionality enabling the UD 102 to operate in the system 100. The processor 504 also supports the methods and teachings described in more detail above corresponding to FIGS. 1-3. Each processor 504 includes any suitable processing or computing device configured to perform one or more operations. Each processor 504 could, for example, include a microprocessor, microcontroller, digital signal processor, field programmable gate array, or application specific integrated circuit.

The UD 102 also includes at least one transceiver 502. The transceiver 502 is configured to modulate data or other content for transmission by at least one antenna or NIC (Network Interface Controller) 510, but typically more than one antenna for beamforming purposes. The transceiver 502 is also configured to demodulate data or other content received by the at least one antenna 510. Each transceiver 502 includes any suitable structure for generating signals for wireless or wired transmission and/or processing signals received wirelessly or by wire. Each antenna 510 includes any suitable structure for transmitting and/or receiving wireless or wired signals. One or multiple transceivers 502 could be used in the UD 102, and one or multiple antennas 510 could be used in the UD 102. Although shown as a single functional unit, a transceiver 502 could also be implemented using at least one transmitter and at least one separate receiver.

The UD 102 further includes one or more input/output devices 508 or interfaces (such as a wired interface to the Internet 508). The input/output devices 508 facilitate interaction with a user or other devices (network communications) in the network. Each input/output device 508 includes any suitable structure for providing information to or receiving/providing information from a user, such as a speaker, microphone, keypad, keyboard, display, or touch screen, including network interface communications.

In addition, the UD 102 includes at least one memory 506. The memory 506 stores instructions and data used, generated, or collected by the UD 102. For example, the memory 506 could store software or firmware instructions executed by the processor 504 and data used to reduce or eliminate interference in incoming signals. Each memory 506 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 6:
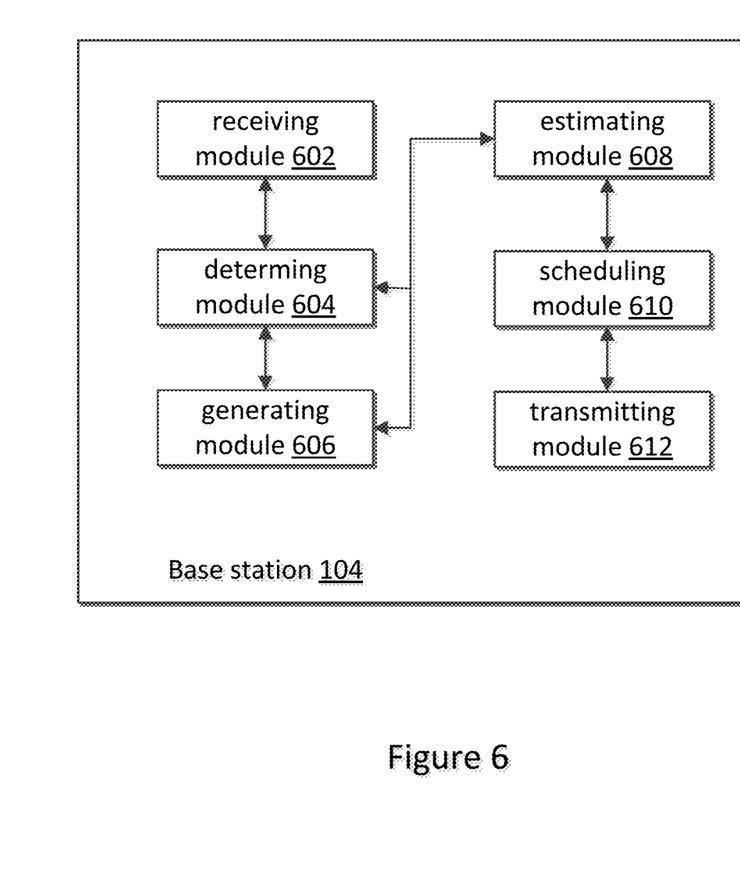
FIG. 6 illustrates a block diagram of hierarchical a base station according to an embodiment of the invention.

FIG. 6 illustrates a block diagram of hierarchical a base station 104 according to an embodiment of the invention. The VR content server 112 may be embodied in a microprocessor-based computer, such as a general purpose personal computer (PC), a custom-made PC, a portable device, but the scope of the invention is not limited to such examples. The base station 104 includes a receiving module 602, a determining module 604, a generating module 606, an estimating module 608, a scheduling module 610 and a transmitting module 612.

The receiving module 602 is connected to the determining module 602 module 604, is configured to receive an indication of a selected beam from each of at least two UDs. The determining module 604 is connected to the receiving module 602 and the generating module 606, is configured to determine, based on the indication of selected beam, a selected beam for each of the at least two UDs.

The generating module 606 is connected to the determining module 604 and the estimating module 608, is configured to generate a virtual UD for each combination of each selected beam and the UD that selects the selected beam. And the estimating module 608 is configured to estimate a data rate for each virtual UD corresponding to the selected beam and the UD that selects the selected beam; and estimate a power gradient for each of selected beams based on the estimated data rates.

In addition, the determining module 604 also connected to the estimated module 608, further configured to determine a power for each of the selected beam based on the power gradient for each of the selected beams.

The scheduling module 610 is connected to the estimating module 608 and the transmitting module 612, is configured to scheduling, based on the determined power, outgoing radio frequency transmissions on one of the selected beams for one of the UDs who selects the scheduled beam. The transmitting module is configured to transmit signals to the UD via the selected beam which is scheduled.

It is understood that except for the above functions, the receiving module 602, the determining module 604, the generating module 606, the estimating module 608, the scheduling module 610 and the transmitting module 612 may also perform the functions of base station 104 described in FIGS. 1-4.

Any of the receiving module 602, the determining module 604, the generating module 606, the estimating module 608, the scheduling module 610 and the transmitting module 612 maybe embodied in a general-purpose central procession unit (CPU), general process, digital signal processor (DSP), field programmable gate array (FPGA), an application-specific integrated circuit (ASIC), or one or more integrated circuits configured to control the execution of program routines as specified by the present invention. The receiving module 602, the determining module 604, the generating module 606, the estimating module 608, the scheduling module 610 and the transmitting module 612 may also be a combination of computing function, such as a combination including one or more microprocessors, combination including DSP and microprocessors and so on. The receiving module 602 and the transmitting module 612 may be combined in a transceiver which includes any suitable structure for generating signals for wireless transmission and/or processing signals received wirelessly. And the receiving module 602 may receive or the transmitting module 612 may send signals from or to (3G, 4G, 5G), Universal Mobile Telecommunications Service (UMTS), Code Division Multiple Access (CDMA), Global System for Mobiles (GMS) etc. network.

Embodiments of this disclosure provide a Network Utility Maximization (NUM) power control algorithm, referred to herein as the Coordinated MIMO Switching (CMS) algorithm. The disclosure provides the above mentioned equations to ensure scheduling the UD r corresponding to a virtual UD i with the largest marginal utility $i_{pj}^*$ to ensure the network utility is maximized. This CMS algorithm can be applied both in TDD and FDD modes. Compared to a reference TDD MU-MIMO mode, the CMS algorithm shows a significant gain in terms of performance as well as convergence and stability. The CMS algorithm can also be equally applied to an FDD MU-MIMO operation mode. This framework fits well in a TDD environment which greatly facilitates practical implementation aspects.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

Additional aspects of the embodiments of the are illustrated the following examples:

EXAMPLE 1

A method performed by a base station for communicating with a plurality of user device (UD), comprising:

receiving an indication of a selected beam from each of at least two UDs;

determining, based on the indication of a selected beam, a selected beam for each of the at least two UDs;

generating a virtual UD for each combination of each selected beam and the UD that selects the selected beam;

estimating a data rate for each virtual UD corresponding to the selected beam and the UD that selects the selected beam;

estimating a power gradient for each of the selected beams based on the estimated data rates; and determining a power for each of the selected beams based on the power gradient for each of the selected beams; and scheduling, based on the determined power, outgoing radio frequency transmissions on one of the selected beams for one of the UDs who selects the scheduled beam.

EXAMPLE 2

The method of example 1 wherein at least one UD selects at least two beams.

EXAMPLE 3

The method according to any one of examples 1-2 wherein at least two of the UDs select a same selected beam.

EXAMPLE 4

The method according to any one of examples 1-3, wherein the indication of a selected beam is a channel condition message, the determining step comprises:

determining, based on the channel condition message, the selected beam for each of the at least two UDs.

EXAMPLE 5

The method according to any one of examples 1-4, wherein the indication of a selected beam is a sounding reference signal (SRS), the determining step comprises:

determining, based on the SRS, the selected beam for each of the at least two UDs.

EXAMPLE 6

The method according to any one of examples 1-5, wherein the method further comprises:

determining that a selected beam has the determined power which is higher than a power threshold and repeating the steps of estimating the data rate, estimating the power gradient, determining the power, and the step of scheduling.

EXAMPLE 7

The method according to any one of examples 1-6, wherein at least two selected beams with the determined power which are higher than a power threshold are selected by one of the at least two UDs, the step of scheduling comprises:

obtaining, based on the determined power and the power gradient, a marginal utility for each of virtual UDs which correspond to the at least two selects beams and correspond to the UD who selects the at least two selected beams;

scheduling the outgoing radio frequency transmission on the one of the at least two beams corresponding to the virtual UD with the highest marginal utility.

EXAMPLE 8

The method according to any one of examples 1-8, wherein at least two UDs select a same selected beam with the determined power which is higher than a power threshold, the step of scheduling comprises:

obtaining, based on the determined power and the power gradient, a marginal utility for each of virtual UDs which corresponds to the selected beam with the determined power which is higher than the power threshold and which correspond to the at least two UDs who select the same selected beam; and scheduling the outgoing radio frequency transmissions on the selected beam with the determined power which is higher than the power threshold for the UD, who corresponds to the virtual UD with the largest marginal utility, among the at least two UDs.

EXAMPLE 9

The method of claim according to any one of examples 1, wherein the process of estimating a power gradient for each selected beam, comprises estimating a network utility power gradient for each selected beam according to:

$$\frac{\partial U}{\partial P_{pj}} = \sum_{r \in R} \frac{\partial U_r}{\partial X_r} \left( \sum_{i \in r} \frac{\partial X_r}{\partial c_{ij}} \frac{\partial c_{ij}}{\partial P_{pj}} \right).$$

EXAMPLE 10

A base station (BS) for communicating with a plurality of user devices (UD), comprising:
a non-transitory memory comprising instructions; and
one or more processors in communications with the memory, wherein the one or more processors are configured to execute the instructions to:
receive an indication of a selected beam from each of at least two UDs;
determine, based on the indication of selected beam, a selected beam for each of the at least two UDs;
generate a virtual UD for each combination of each selected beam and the UD that selects the selected beam;
estimate a data rate for each virtual UD corresponding to the selected beam and the UD that selects the selected beam;
estimate a power gradient for each of the selected beams based on the estimated data rates;
determine a power for each of the selected beams based on the power gradient for each of the selected beams; and
schedule, based on the determined power, outgoing radio frequency transmissions on one of the selected beams for one of the UDs who selects the scheduled beam.

EXAMPLE 11

The base station according to example 10, wherein the indication of a selected beam is a channel condition message, the one or more processors are configured to further execute the instructions to:
determine, based on the channel condition message, the selected beam for each of the at least two UDs.

EXAMPLE 12

The base station according to any one of examples 10-11, wherein the indication of a selected beam is a sounding reference signal (SRS), the one or more processors are configured to further execute the instructions to:
determine, based on the SRS, the select beam for each of the at least two UDs.

EXAMPLE 13

The base station according to any one of examples 10-12, wherein the one or more processors are configured to further execute the instructions to:
determine that a selected beam has the determined power which is higher than a power threshold and repeating the steps of estimate the data rate, estimate the power gradient, determine the power and the step of scheduling.

EXAMPLE 14

The base station according to any one of examples 10-13, wherein at least one of the selected beams has a determined power which is higher than a power threshold, the one or more processors are configured to further execute the instructions to:
schedule, based on the indication of selected beams, outgoing radio frequency transmissions for the UD that selected the beam with the determined power which is higher than the power threshold.

EXAMPLE 15

The base station according to any one of examples 10-14, wherein at least two selected beams with the determined power which are higher than a power threshold are selected by one of the at least two UDs, the one or more processors are configured to further execute the instructions to:
obtain, based on the determined power and the power gradient, a marginal utility for each of virtual UDs which correspond to the at least two selected beams and correspond to the UD who selects the at least two selected beams; and
schedule the outgoing radio frequency transmissions on the one of the at least two beams corresponding to the virtual UD with the highest marginal utility.

EXAMPLES 16

The base station according to any one of examples 10-15, wherein at least two UDs select a same selected beam with the determined power which is higher than the power threshold, the one or more processors are configured to further execute the instructions to:
obtain, based on the determined power and the power gradient, a marginal utility for each of the virtual UDs which correspond to the selected beams with the determined power which is higher that the power threshold and which correspond to the at least two UDs who select the same selected beam; and
schedule the outgoing radio frequency transmissions on the selected beam with the determined power which is higher than the power threshold for the UD, who corresponds to the virtual UD with the largest marginal utility, among the at least two UDs.

EXAMPLE 17

The base station according to any one of examples 10-16, wherein the one or more processors are configured to further execute the instructions to obtain the network utility power gradient:

$$\frac{\partial U}{\partial P_{pj}} = \sum_{r \in R} \frac{\partial U_r}{\partial X_r} \left( \sum_{i \in r} \frac{\partial X_r}{\partial c_{ij}} \frac{\partial c_{ij}}{\partial P_{pj}} \right).$$

EXAMPLE 18

A computer readable media that includes computer instructions that, when executed by a processor, cause a processor host device to perform the steps of: receiving an indication of a selected beam from each of at least two UDs;
determining, based on the indication of selected beam, the selected beam for each of the at least two UDs;
generating a virtual UD identifier (ID) for each combination of each selected beam and the UD that selects the selected beam;

estimating a data rate for each virtual UD corresponding to both the selected beam and the UD that selects the selected beam;
estimating a power gradient for each of the selected beams based on the estimated data rates; and
determining a power for each of the selected beam based on the power gradient for each of the selected beams; and
scheduling, based on the determined power, outgoing radio frequency transmissions on one of the selected beams for one of the UDs who selects the selected beam.

EXAMPLE 19

The computer readable media according to example 18, wherein the processor host device further performs the steps of: determining, based on the channel condition message or a sounding reference signal (SRS), the selected beam for each of the at least two UDs.

EXAMPLE 20

The computer readable media according to any one of examples 18-19, wherein the processor host device further performs the steps of:
determining that a selected beam has the determined power which is higher than a power threshold and repeating the steps of estimating the data rate, estimating the power gradient, determining the power, and the step of scheduling.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for communicating with user devices (UDs), comprising:
   receiving, by a base station, indication(s) of selected beam(s) for physical UDs in a group of physical UDs, at least two beams being selected by a common physical UD;
   generating, by the base station based on the received indication(s), different virtual UDs for different combinations of selected beams and each physical UD, from the group of physical UDs, that selected the selected beam such that separate virtual UDs are generated for the common physical UD;
   estimating, by the base station, data rates for the different virtual UDs;
   estimating, by the base station, power gradient(s) for the selected beam(s) based on the estimated data rates of the different virtual UDs;
   determining, by the base station, power level(s) for the selected beam(s) based on the estimated power gradient(s); and
   scheduling, by the base station, based on the determined power level(s) for the selected beam(s), outgoing radio frequency transmissions for physical UDs in the group of physical UDs; and based thereon
   transmitting, by the base station, the outgoing radio frequency transmissions to physical UDs in the group of physical UDs.

2. The method of claim 1, wherein the indication(s) of the selected beam(s) are channel condition message(s).

3. The method of claim 1, wherein the indication(s) of the selected beam(s) are sounding reference signal(s).

4. The method of claim 1, wherein the method further comprises:
   determining that one of the determined power level(s) for a corresponding one of the selected beam(s) exceeds a power threshold and based thereon re-estimating a data rate and a power gradient for the corresponding selected beam.

5. The method of claim 4, further comprising determining a new power level for the corresponding selected beam and re-scheduling at least one of the outgoing radio frequency transmissions based on the new power level for the corresponding selected beam.

6. The method of claim 1, wherein scheduling the outgoing radio frequency transmissions for physical UDs in the group of physical UDs based on the determined power levels comprises:
   determining that at least a first beam and a second beam, selected by the common physical UD, have determined power levels that exceed a threshold, a first virtual UD being generated by the combination of the first beam and the common physical UD and a second virtual UD being generated by the combination of the second beam and the common physical UD;
   determining that a utility of the first virtual UD exceeds a utility of the second virtual UD; and based thereon
   scheduling an outgoing radio frequency transmission of the common physical UD over the first beam.

7. The method of claim 1, wherein estimating power gradient(s) for the selected beam(s) based on the estimated data rates of the virtual UDs comprises estimating a network utility power gradient for each selected beam according to:

$$\frac{\partial U}{\partial P_{pj}} = \sum_{r \in \mathcal{R}} \frac{\partial U_r}{\partial X_r} \left( \sum_{i \in r} \frac{\partial X_r}{\partial c_{ij}} \frac{\partial c_{ij}}{\partial P_{pj}} \right).$$

wherein:

$$\frac{\partial U}{\partial P_{pj}}$$

represents the power gradient for each selected beam;
   $U_r$ represents a utility for UD r;
   $X_r$ represents the data rate of UD r;
   $c_{ij}$ represents the instantaneous channel capacity; and
   $P_{pj}$ represents the power for the selected beam.

8. A base station for communicating with user devices (UDs), the base station comprising:
   a processor; and
   a non-transitory computer readable storage medium storing programming for execution by the processor, the programming including instructions to:
   receive indication(s) of selected beam(s) for physical user devices (UDs) in a group of physical UDs, at least two beams being selected by a common physical UD;
   generate, based on the received indication(s), different virtual UDs for different combinations of selected beams and each physical UD, from the group of physical UDs, that selected the selected beam such that separate virtual UDs are generated for the common physical UD;

estimate, by the base station, data rates for the different virtual UDs;

estimate, by the base station, power gradient(s) for the selected beam(s) based on the estimated data rates of the different virtual UDs;

determine, by the base station, power level(s) for the selected beam(s) based on the estimated power gradient(s); and schedule based on the determined power level(s) for the selected beam(s), outgoing radio frequency transmissions for physical UDs in the group of physical UDs; and based thereon transmit the outgoing radio frequency transmissions to physical UDs in the group of physical UDs.

9. The base station of claim 8, wherein the indication(s) of the selected beam(s) are channel condition message(s).

10. The base station of claim 8, wherein the indication(s) of the selected beam(s) are sounding reference signal(s).

11. The base station of claim 8, wherein the method further comprises:

determine that one of the determined power level(s) for a corresponding one of the selected beam(s) exceeds a power threshold and based thereon re-estimating a data rate and a power gradient for the corresponding selected beam.

12. The base station of claim 8, further comprising determine a new power level for the corresponding selected beam and re-scheduling at least one of the outgoing radio frequency transmissions based on the new power level for the corresponding selected beam.

13. The base station of claim 8, wherein scheduling the outgoing radio frequency transmissions for physical UDs in the group of physical UDs based on the determined power levels comprises:

determine that at least a first beam and a second beam, selected by the common physical UD, have determined power levels that exceed a threshold, a first virtual UD being generated by the combination of the first beam and the common physical UD and a second virtual UD being generated by the combination of the second beam and the common physical UD;

determine that a utility of the first virtual UD exceeds a utility of the second virtual UD; and based thereon schedule an outgoing radio frequency transmission of the common physical UD over the first beam.

14. The base station of claim 8, wherein estimating power gradient(s) for the selected beam(s) based on the estimated data rates of the virtual UDs comprises estimating a network utility power gradient for each selected beam according to:

$$\frac{\partial U}{\partial P_{pj}} = \sum_{r \in R} \frac{\partial U_r}{\partial X_r} \left( \sum_{i \in r} \frac{\partial X_r}{\partial c_{ij}} \frac{\partial c_{ij}}{\partial P_{pj}} \right).$$

wherein:

$$\frac{\partial U}{\partial P_{pj}}$$

represents the power gradient for each selected beam;
$U_r$ represents a utility for UD r;
$X_r$ represents the data rate of UD r;
$c_{ij}$ represents the instantaneous channel capacity; and
$P_{pj}$ represents the power for the selected beam.

15. A method for communicating with user devices (UDs), comprising:

receiving, by a base station, indication(s) of selected beam(s) for physical UDs in a group of physical UDs, a common beam being selecting for different physical UDs;

generating, by the base station based on the received indication(s), different virtual UDs for different combinations of beams and physical UDs, in the group of physical UDs, that selected the selected beams such that separate virtual UDs are generated for the respective combinations of the common beam and the two different physical UDs that selected the common beam;

estimating, by the base station, data rates for the different virtual UDs;

estimating, by the base station, power gradient(s) for the selected beam(s) based on the estimated data rates of the different virtual UDs;

determining, by the base station, power level(s) for the selected beam(s) based on the estimated power gradient(s); and scheduling, by the base station, based on the determined power level(s) for the selected beam(s), outgoing radio frequency transmissions for physical UDs in the group of physical UDs;

and based thereon transmitting, by the base station, the outgoing radio frequency transmissions to physical UDs in the group of physical UDs.

16. The method of claim 15, wherein the indication(s) of the selected beam(s) are channel condition message(s).

17. The method of claim 15, wherein the indication(s) of the selected beam(s) are sounding reference signal(s).

18. The method of claim 15, wherein the method further comprises:

determining that one of the determined power level(s) for a corresponding one of the selected beam(s) exceeds a power threshold and based thereon re-estimating a data rate and a power gradient for the corresponding selected beam.

19. The method of claim 18, further comprising determining a new power level for the corresponding selected beam and re-scheduling at least one of the outgoing radio frequency transmissions based on the new power level for the corresponding selected beam.

20. The method of claim 15, wherein scheduling the outgoing radio frequency transmissions for physical UDs in the group of physical UDs based on the determined power levels comprises:

determining that the common beam, which was selected by a first physical UD and a second physical UD, has a determined power level that exceeds a threshold, a first virtual UD being generated by the combination of the common beam and the first physical UD and a second virtual UD being generated by the combination of the common beam and the second physical UD;

determining that a utility of the first virtual UD exceeds a utility of the second virtual UD; and based thereon scheduling an outgoing radio frequency transmission of the first UE over the common beam.

21. The method of claim 15, wherein estimating power gradient(s) for the selected beam(s) based on the estimated data rates of the virtual UDs comprises estimating a network utility power gradient for each selected beam according to:

$$\frac{\partial U}{\partial P_{pj}} = \sum_{r \in R} \frac{\partial U_r}{\partial X_r} \left( \sum_{i \in r} \frac{\partial X_r}{\partial c_{ij}} \frac{\partial c_{ij}}{\partial P_{pj}} \right).$$

wherein:

$$\frac{\partial U}{\partial P_{pj}}$$

represents the power gradient for each selected beam;
$U_r$ represents a utility for UD r;
$X_r$ represents the data rate of UD r;
$c_{ij}$ represents the instantaneous channel capacity; and
$P_{pj}$ represents the power for the selected beam.

22. A base station for communicating with user devices (UDs), the base station comprising:
a processor; and
a non-transitory computer readable storage medium storing programming for execution by the processor, the programming including instructions to:
receive indication(s) of selected beam(s) for physical UDs in a group of physical UDs, a common beam being selecting for different physical UDs;
generate, based on the received indication(s), different virtual UDs for different combinations of beams and physical UDs, in the group of physical UDs, that selected the selected beams such that separate virtual UDs are generated for the respective combinations of the common beam and the two different physical UDs that selected the common beam;
estimate data rates for the different virtual UDs;
estimate power gradient(s) for the selected beam(s) based on the estimated data rates of the different virtual UDs;
determine power level(s) for the selected beam(s) based on the estimated power gradient(s); and
schedule based on the determined power level(s) for the selected beam(s), outgoing radio frequency transmissions for physical UDs in the group of physical UDs; and based thereon
transmit the outgoing radio frequency transmissions to physical UDs in the group of physical UDs.

23. The base station of claim 22, wherein the indication(s) of the selected beam(s) are channel condition message(s).

24. The base station of claim 22, wherein the indication(s) of the selected beam(s) are sounding reference signal(s).

25. The base station of claim 22, wherein the method further comprises:
determine that one of the determined power level(s) for a corresponding one of the selected beam(s) exceeds a power threshold and based thereon re-estimating a data rate and a power gradient for the corresponding selected beam.

26. The base station of claim 25, further comprising determining a new power level for the corresponding selected beam and re-scheduling at least one of the outgoing radio frequency transmissions based on the new power level for the corresponding selected beam.

27. The base station of claim 22, wherein scheduling the outgoing radio frequency transmissions for physical UDs in the group of physical UDs based on the determined power levels comprises:
determine that the common beam, which was selected by a first physical UD and a second physical UD, has a determined power level that exceeds a threshold, a first virtual UD being generated by the combination of the common beam and the first physical UD and a second virtual UD being generated by the combination of the common beam and the second physical UD;
determine that a utility of the first virtual UD exceeds a utility of the second virtual UD; and based thereon
schedule an outgoing radio frequency transmission of the first UE over the common beam.

28. The base station of claim 22, wherein estimating power gradient(s) for the selected beam(s) based on the estimated data rates of the virtual UDs comprises estimating a network utility power gradient for each selected beam according to:

$$\frac{\partial U}{\partial P_{pj}} = \sum_{r \in \mathcal{R}} \frac{\partial U_r}{\partial X_r} \left( \sum_{i \in r} \frac{\partial X_r}{\partial c_{ij}} \frac{\partial c_{ij}}{\partial P_{pj}} \right).$$

wherein:

$$\frac{\partial U}{\partial P_{pj}}$$

represents the power gradient for each selected beam;
$U_r$ represents a utility for UD r;
$X_r$ represents the data rate of UD r;
$c_{ij}$ represents the instantaneous channel capacity; and
$P_{pj}$ represents the power for the selected beam.

* * * * *